Figure 1:
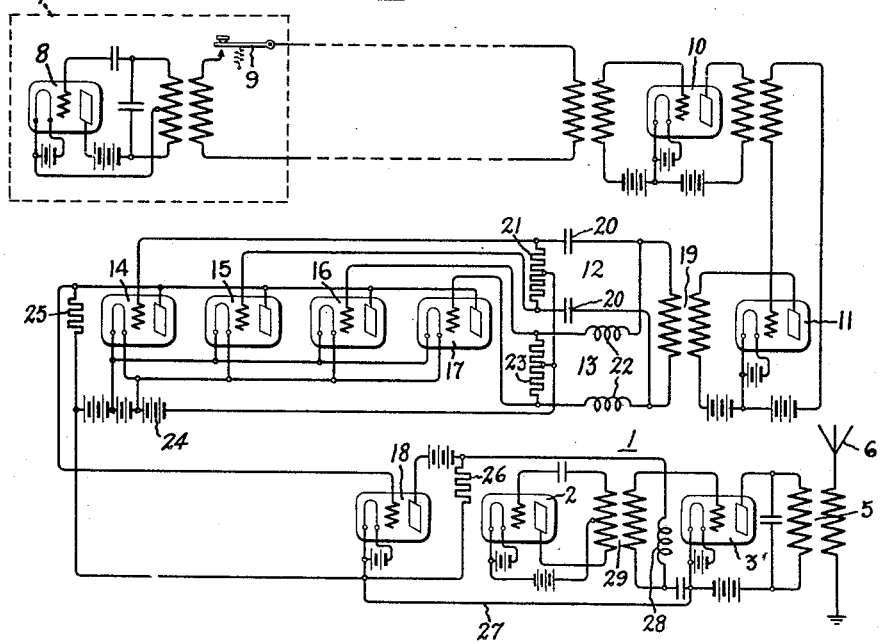

Nov. 15, 1932.  P. C. GARDINER  1,888,077
TRANSMITTING SYSTEM
Filed Oct. 14, 1930  2 Sheets-Sheet 1

Inventor:
Paul C. Gardiner,
by Charles E. Tullar
His Attorney.

Inventor:
Paul C. Gardiner,
by Charles T. Mullen
His Attorney.

Patented Nov. 15, 1932

1,888,077

UNITED STATES PATENT OFFICE

PAUL C. GARDINER, OF SCOTIA, NEW YORK, ASSIGNOR TO GENERAL ELECTRIC COMPANY, A CORPORATION OF NEW YORK

TRANSMITTING SYSTEM

Application filed October 14, 1930. Serial No. 488,616.

My invention relates to transmitting systems and more particularly to signal transmitting systems in which desired signals are transmitted by keying, or impulsing a transmitted carrier wave.

In certain types of signaling, as for example facsimile transmission, the signal impulses to be transmitted by means of high frequency carrier current are produced in an alterating current wave of lower frequency. Where these impulses are of comparatively low rate the lower frequency alternating current wave may be rectified, smoothed by means of any suitable smoothing network thereby to eliminate the alternating current ripple and then utilized to control one or more of the discharge devices of the high frequency transmitter. I have found, however, that where the impulses are of very rapid rate the smoothing means employed to eliminate the undesired ripple is likely also to eliminate the interruptions between impulses thereby causing a substantially continuous electromotive force to be supplied to the discharge devices of the transmitter.

This result is apparent from a consideration of the operation of a smoothing network in which shunt capacitance is utilized. This capacitance becomes charged during periods of maximum impressed electromotive force and tends to discharge during periods of minimum impressed electromotive force. If a steady electromotive force having a superimposed variable component, or ripple, is supplied to the network, the time required for the charging and discharging of the capacitance may be such that the instantaneous voltage of the capacitance does not follow the form of the impressed variable component but instead assumes a certain steady value between the maximum and minimum of the impressed variable voltage. Thus the impressed ripple component is removed.

If now the supplied voltage is keyed, or impulsed, at a very rapid rate, as in accordance with desired signals, a similar result occurs. The shunt capacitance will assume a certain charge during each impulse but may not become completely discharged between impulses with the result that a certain electromotive force is continuously supplied to the load circuit. The more rapid the impulsing of the impressed voltage the more steady the voltage supplied to the load becomes until at a certain high rate the output voltage does not sufficiently represent the impressed voltage to cause a faithful reproduction of the impressed signals, or in fact, to be useful for signaling purposes.

A further object of the invention is to provide means whereby direct current impulses of high frequency, having a minimum of alternating current ripple, are produced in accordance with interruptions in an alternating current wave, and supplied to the keying circuit of a transmitter, which means is of such a nature that the keying circuit of the transmitter is substantially free from shunt capacitance.

Figure 2:
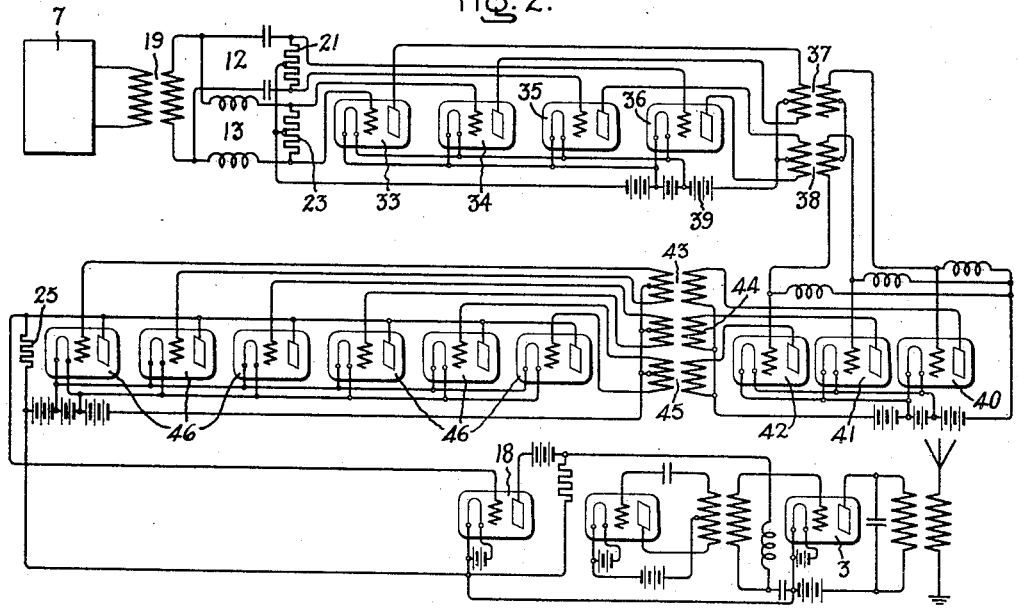
Figure 3:
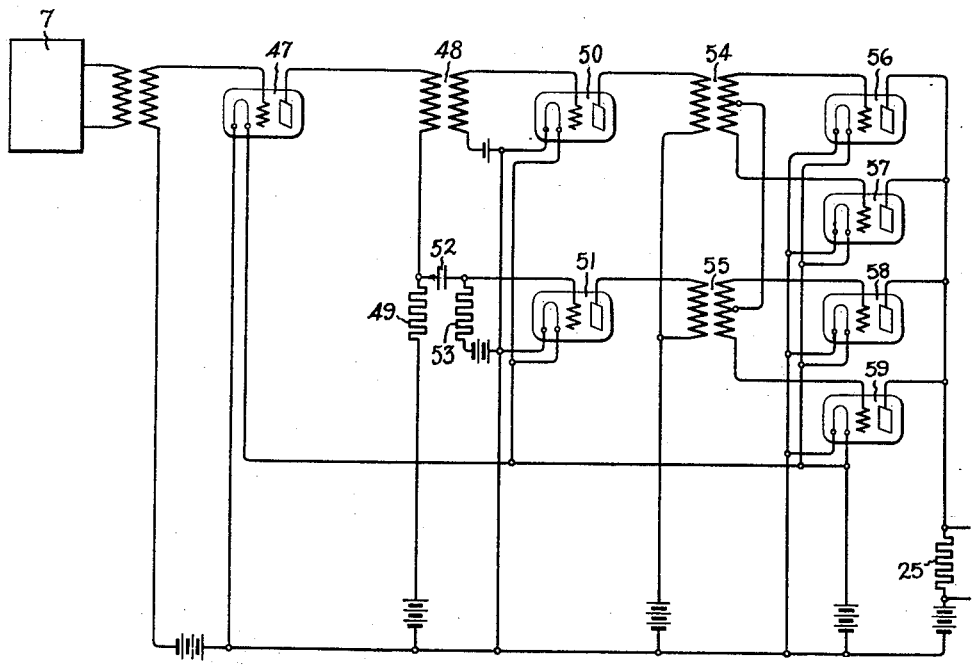
Figure 4:
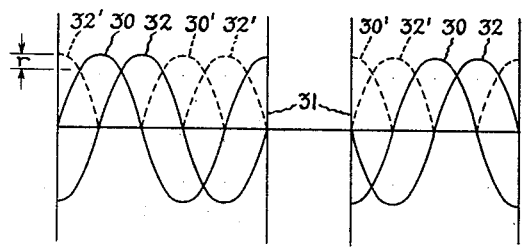

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which Figs. 1, 2 and 3 represent different embodiments of my invention; and Fig. 4 represents a characteristic thereof.

Referring to Fig. 1 of the drawings, I have shown at 1 a high frequency transmitter comprising a high frequency carrier wave oscillation generator 2 connected to supply oscillations to the grid of an amplifier 3, the output circuit of which is coupled by means of a transformer 5 to a suitable load circuit which may comprise an antenna 6.

In the upper left hand portion of the figure I have shown a rectangle 7 to represent any source of alternating electromotive force having rapidly occurring interruptions therein. Thus within the rectangle I have shown conventionally an electron discharge oscillation generator 8 the output circuit of which includes a key 9 which may be operated at a rapid rate by any suitable means, not shown, as for example, for high speed telegraphic, or facsimile transmission.

As applied to facsimile transmission systems, however, the rectangle 7 may be understood to represent a facsimile transmitter of present well known construction in which a beam of light is employed to scan the material to be transmitted and in which alternating current impulses are transmitted under control of the light beam in accordance with the light and dark areas of the material scanned. Thus these interruptions may occur at a very rapid rate.

In order to key, or to impulse, the transmitter 1 in accordance with the impulses in the alternating current output from the apparatus represented by the rectangle 7, additional means comprising cascade connected electron discharge amplifiers 10 and 11, phase splitting circuits 12 and 13, electron discharge rectifiers 14, 15, 16 and 17, and direct current amplifier 18 are provided.

Thus oscillations from the equipment 7 are amplified by the amplifiers 10 and 11 and supplied to the phase splitting circuits 12 and 13. These phase splitting circuits are connected across the secondary winding of a transformer 19 the primary of which is connected in the anode circuit of the amplifier 11. The circuit 12 comprises condensers 20 and a resistance 21 connected in series. Similarly the phase splitting circuit 13 comprises series connected inductances 22 and resistance 23. The capacitance of the condensers 20, the inductance of the coils 22, and the resistances 21 and 23 are all so proportioned relatively to each other as to cause electromotive forces to be produced across the resistances 21 and 23 bearing a substantial quarter phase relation to each other. That is, these electromotive forces are displaced in phase by substantially 90°. Opposite points on each of these resistances are connected to the grids of a pair of the electron discharge rectifiers or detectors 14, 15, 16 and 17. Thus opposite points on resistance 21 are connected to the grids of rectifiers 14 and 15 and opposite points on resistance 23 are connected to the grids of rectifiers 16 and 17. The midpoint of each of these resistances is connected through a suitable source of biasing potential 24 to the cathode of the electron discharge rectifiers. The anodes of all of these rectifiers are connected together and to the cathodes through a resistance 25, this resistance being connected directly between the grid and cathode of direct current amplifier 18. This amplifier also includes a resistance 26 in its anode circuit. This resistance 26 is in turn included in a circuit extending between the grid and cathode of electron discharge amplifier 3. This circuit extends from the cathode of the amplifier 3 through conductor 27, resistance 26, radio frequency choke coil 28 and secondary winding of transformer 29 to the grid of amplifier 3. Thus the direct current bias potential upon the grid of amplifier 3 is determined by the potential upon resistance 26 which in turn is controlled by the potential upon resistance 25.

The operation of the arrangement may be better understood with reference to Fig. 4 in which I have shown two groups of waves representing two impulses separated by a time interval represented by the distance between lines 31. If we assume that a sine wave of alternating current voltage is produced by the equipment 7, this sine wave will appear across the secondary winding of transformer 19. By means of the phase splitting circuits two sine wave electromotive forces are produced which are displaced in phase by substantially ninety degrees. These electromotive forces may be represented by the curves 30 and 32 in Fig. 4, the curve 30 representing the electromotive force appearing across resistance 21 and the curve 32 that across resistance 23.

The electromotive force appearing across resistance 21, that is the wave 30 of Fig. 4, is supplied in opposed phase relation to the grids of detectors 14 and 15, and similarly the electromotive force appearing across resistance 23, that is the wave 32, is supplied in opposed phase relation to the grids of detectors 16 and 17. The grids of devices 14, 15, 16 and 17 are preferably biased sufficiently negative by source 24 just to prevent the flow of anode current when no alternating current is impressed upon the grid. A somewhat lower bias, however, such as to cause the device to operate on the upper curved portion of the anode current-grid voltage characteristic curve may be employed. Accordingly, a substantial current increase occurs in each device during the positive half cycle of the alternating current wave whereas comparatively little change in current occurs during the negative half cycle. Thus during one half cycle when the grid of detector 14 is positive the anode current in this device may be assumed to follow curve 30. During the next half cycle the anode current in detector 14 diminishes but an increase occurs in detector 15 in accordance with curve 30′ since the grid of this device is now positive. A similar operation, of course, occurs in detectors 16 and 17 but the increase in current in these detectors is in accordance with curves 32 and 32′, these curves being displaced from curves 30 and 30′ respectively by substantially ninety degrees. The current flowing in the resistance 25, and hence the potential across the resistance, then has the shape of the envelope of these curves. This envelope thus represents the electromotive forces of the uniformly displaced phases combined in a unidirectional sense. This potential is amplified and impressed upon resistance 26 and hence upon the grid of amplifier 3.

The polarities of the electromotive forces on resistances 25 and 26 are such that the grid of amplifier 3 is driven negative during each interruption of the output from the equipment 7, and the magnitude of the negative potential supplied to the grid of amplifier 3 is such that the transmission of high frequency carrier wave energy is completely interrupted during each interruption of the output from equipment 7.

It will be observed that the current in resistance 25 has four maxima for each cycle of the alternating current wave and that the alternating current ripple therefore is reduced to a very small value represented by $r$ in Fig. 4 such that the necessity for a smoothing network associated with resistances 25 or 26 is avoided, the potential on these resistances being used directly to key the transmitter.

In Fig. 2, I have shown a further embodiment of my invention which is somewhat similar to Fig. 1 with the exception that instead of impressing the two phases produced by the phase splitting circuits 12 and 13 directly upon the detectors, these phases are multiplied to 3 and then to 6 phases prior to rectification.

Thus referring to the Fig. 2, it will be seen that the output from equipment 7 is supplied through transformer 19 to the phase splitting circuits 12 and 13. The electromotive force produced upon resistances 21 and 23 of these circuits is then amplified by means of push pull amplifiers 33 and 34, and 35 and 36. The two anodes of amplifiers 33 and 34 are connected to opposite terminals of the primary winding of transformer 37 and similarly the two anodes of amplifiers 35 and 36 are connected to opposite terminals on the primary winding of transformer 38 the midpoints of these windings being connected to the cathodes of all of the discharge devices through a source of anode potential 39. One terminal of the secondary winding of transformer 37 is connected to the midpoint of the secondary winding of transformer 38 and the other terminal of this winding and each of the terminals of the secondary winding of transformer 38 are connected to the grids of electron discharge amplifiers 40, 41 and 42. Transformers 37 and 38 as thus connected operate to convert the quarter phase oscillations produced by the phase splitting circuits 12 and 13 to 3 phase oscillations. Each phase of these three phase oscillations are then supplied through the primary winding of one of transformers 43, 44 and 45, the opposite terminals of the secondary windings of each of which are connected to the grids of electron discharge detectors 46. The cathodes of all of these detectors are connected together and to the midpoint of the secondary winding of transformers 43, 44 and 45. Thus by means of transformers 43, 44 and 45 the three phase oscillations produced by transformers 37 and 38 are converted to six phase oscillations. The anodes of the electron discharge detectors 46 are connected together and to the cathodes of these detectors through the resistance 25 corresponding to the resistance 25 of Fig. 1. The potential upon this resistance is then amplified by direct current amplifier 18 and supplied to the grid of high frequency amplifier 3 exactly as has been described in connection with Fig. 1.

It will be seen that with this arrangement a greater number of maxima in the current flowing in resistance 25 occur during each cycle of the A. C. output from equipment 7 and that the ripple is correspondingly reduced. I have found, however, that it ordinarily is not necessary to utilize this higher number of phases but that very rapid facsimile transmission may be satisfactorily effected by the arrangement shown in Fig. 1.

In Fig. 3, I have shown a still further embodiment of my invention in which the output from the equipment 7 is supplied to the grid of an electron discharge amplifier 47. The anode circuit of this amplifier includes the primary winding of a transformer 48 and a resistance 49. The resistance 49 is of such value that the electromotive force appearing upon it is 90° displaced in phase with respect to the voltage upon the primary of transformer 48. The secondary winding of transformer 48 is connected between the grid and cathode of a second amplifier 50. The potential upon resistance 49 is supplied to the grid of amplifier 51 through a coupling arrangement comprising condenser 52 and resistance 53, the condenser 52 being connected directly between the resistance 49 and the grid, and the resistance 53 being connected between the grid and the cathode of the discharge device 51. The capacitance of condenser 52 is made large as compared with the internal capacitance between the grid and cathode of discharge device 51 whereby the electromotive force of resistance 49 is supplied to the grid without substantial phase displacement. It will thus be seen that quarter phase electromotive forces appear in the anode circuits of the amplifiers 50 and 51. Each of these anode circuits includes the primary winding of a transformer 54 and 55 respectively, the opposite terminals of the secondary windings of which are connected to the grids of push pull detectors 56 and 57, and 58 and 59. These anodes are connected together and to the cathodes through a resistance 25, the potential of which may be utilized in the manner explained in connection with Figs. 1 and 2.

While I have shown particular embodiments of my invention, it will of course be understood that I do not wish to be limited thereto since many modifications may be made both in the circuit arrangement and in the instrumentalities employed. I therefore contemplate by the appended claims to cover any such modifications as fall within the true spirit and scope of my invention.

What I claim as new and desire to secure by Letters Patent in the United States is:

1. The method of keying a transmitter comprising a source of oscillations in accordance with rapid impulses of single phase oscillations which includes the steps of converting said single phase oscillations to polyphase oscillations, rectifying said polyphase oscillations and controlling the output from said source of oscillations in accordance with the unidirectional electromotive force resulting from said rectification.

2. The method of keying a transmitter comprising a source of oscillations in accordance with rapid impulses of oscillatory electromotive force, which includes producing a plurality of electromotive forces uniformly displaced in phase and dependent in amplitude upon said oscillatory electromotive force and supplying said electromotive forces in a unidirectional sense to said transmitter in such a way as to control the output from said source of oscillations in accordance with said rapid impulses.

3. In combination, with a transmitter comprising a source of oscillations, of means for keying said transmitter in accordance with rapid impulses of single phase oscillations, said means comprising means for converting said single phase oscillations into polyphase oscillations, means for rectifying said polyphase oscillations, and means for keying said transmitter in accordance with the unidirectional electromotive force resulting from said rectification.

4. In combination, a transmitter, means for keying said transmitter in accordance with rapid impulses of single phase oscillations, said means including a keying circuit which is substantially free from shunt capacitance, means for producing and unidirectionally combining a plurality of electromotive forces dependent in amplitude upon said oscillations, said electromotive forces being substantially uniformly displaced in phase, and means for supplying the combined electromotive forces to said keying circuit.

5. In combination, a transmitter having a keying circuit, a plurality of electron discharge devices, each of said devices having an anode and cathode connected unidirectionally across said keying circuit, means for generating impulses of polyphase oscillations in accordance with desired signals, means for controlling each of said discharge devices in accordance with one phase of said polyphase oscillations, whereby impulses of unidirectional electromotive force in accordance with said signals are produced across said keying circuit, said keying circuit having insufficient shunt capacitance to effect material smoothing of said unidirectional electromotive force.

6. In combination, with a transmitter comprising a source of oscillations and keying means therefor, of a plurality of electron discharge detectors, each of said detectors having an anode, a cathode, and a grid, the anodes and cathodes of said detectors being connected unidirectionally across said keying means, means for generating impulses of polyphase oscillations in accordance with desired signals and supplying one phase of said oscillations to each of said grids, whereby impulses of unidirectional electromotive force are supplied to said keying means in accordance with said signals.

7. In combination, a high frequency transmitter including an amplifier having a grid and cathode, a resistance connected between said grid and cathode, a polyphase rectifier connected to supply unidirectional electromotive force to said resistance, means for supplying polyphase electromotive force to said rectifier, and means for interrupting said polyphase electromotive force in accordance with desired signals.

8. In combination, a high frequency transmitter, a resistance, means for controlling said transmitter in accordance with the potential on said resistance, a plurality of pairs of electron discharge devices, each of said devices having an anode, a cathode and a grid, said resistance being connected between the anode and cathode of each device, means for generating impulses of single phase electromotive force in accordance with desired signals, means for splitting said single phase electromotive force into two phases displaced by substantially ninety degrees, and means for supplying each phase of said electromotive force to the grids of one pair of said discharge devices in opposed phase relation.

In witness whereof, I have hereunto set my hand this 13th day of October, 1930.

PAUL C. GARDINER.